United States Patent
Teirelbar et al.

(10) Patent No.: US 11,239,751 B2
(45) Date of Patent: Feb. 1, 2022

(54) DC-COUPLED HYBRID ENERGY SYSTEM AND METHOD FOR CONVERTING DC VOLTAGES

(71) Applicant: KarmSolar, Cairo (EG)

(72) Inventors: Ahmed Teirelbar, Cairo (EG); Bassem Saleh, Alexandria (EG); Amr Wasfi, Alexandria (EG)

(73) Assignee: KARMSOLAR, Cairo (EG)

( * ) Notice: Subject to any disclaimer, the term of this patent is extended or adjusted under 35 U.S.C. 154(b) by 88 days.

(21) Appl. No.: 16/860,412

(22) Filed: Apr. 28, 2020

(65) Prior Publication Data

US 2021/0336538 A1 Oct. 28, 2021

(51) Int. Cl.
| | |
|---|---|
| H02M 3/157 | (2006.01) |
| H02M 3/158 | (2006.01) |
| H02J 3/02 | (2006.01) |
| H02M 1/10 | (2006.01) |
| H02J 3/38 | (2006.01) |
| H02M 1/00 | (2006.01) |

(52) U.S. Cl.
CPC ............... H02M 3/157 (2013.01); H02J 3/02 (2013.01); H02J 3/381 (2013.01); H02M 1/10 (2013.01); H02M 3/1584 (2013.01); *H02J 2300/24* (2020.01); *H02M 1/0009* (2021.05)

(58) Field of Classification Search
CPC ...... H02M 3/157; H02M 1/10; H02M 3/1584; H02M 1/0009; H02J 3/02
See application file for complete search history.

(56) References Cited

U.S. PATENT DOCUMENTS

| | | | |
|---|---|---|---|
| 2005/0265058 A1* | 12/2005 | Stevanovic | H02M 3/156 363/131 |
| 2007/0114985 A1* | 5/2007 | Latham | H02M 3/157 323/283 |
| 2009/0027025 A1* | 1/2009 | Latham | H02M 3/157 323/283 |
| 2014/0002044 A1* | 1/2014 | Babazadeh | H02M 3/1588 323/282 |
| 2017/0104411 A1* | 4/2017 | Tomasovics | H02M 3/157 |
| 2018/0138812 A1* | 5/2018 | Rose | H02M 3/156 |

* cited by examiner

*Primary Examiner* — Kyle J Moody
*Assistant Examiner* — Lakaisha Jackson
(74) *Attorney, Agent, or Firm* — Myers Wolin, LLC (57) ABSTRACT

A method is provided for setting an operating parameter for a DC to DC voltage converter. A load is operated, using a controller, with the operating parameter at a first value. A measurement of an actual inductor current at an inductor of the DC to DC voltage converter, a measurement of an actual load current are provided. The method then determines a reference value for the inductor current, based on the actual load current combined with an inductor current adjustment value based on a desired output voltage at the DC load. The reference value for the inductor current is then compared to the actual inductor current, and the operating parameter is maintained at the first value if the reference value is greater than the actual inductor current. The operating parameter is changed to a second value if the reference value is less than the actual inductor current.

20 Claims, 6 Drawing Sheets

DC-COUPLED HYBRID ENERGY SYSTEM AND METHOD FOR CONVERTING DC VOLTAGES

FIELD OF THE INVENTION

The invention relates to a system and method for converting DC voltages by controlling an operating parameter of a DC to DC voltage converter.

BACKGROUND

Increasing the renewable energy share in the energy mix nowadays and the transition to distributed generation of energy shows the need for hybrid energy systems in order to enhance the intermittent behavior of many renewable energy sources, such as photovoltaic (PV) energy sources. Accordingly, it is necessary to couple multiple energy systems. Existing PV-Diesel generator hybrid systems use an AC coupling topology. Such an AC topology provides stable operation to loads regardless of the PV output power at any time of the day. However, these AC coupled systems result in increased operating costs due to, for example, the spinning reserve for any connected generators. This may, in turn, increase PV curtailment losses, and it results in a need to keep the generator running all the times as the prime energy source of the system.

Additional challenges exist in AC coupled PV-Diesel hybrid systems. For example, AC systems require that the different sources be synchronized.

DC coupled hybrid systems allow for shutting down the generator side of such a hybrid system completely during the peak time for a connected PV system, assuming that the PV is sized to fulfill a load demand. This provides an ability to reduce the PV curtailment loss if the entire system is sized properly. Taking into account the need for synchronization AC systems, a DC coupling may allow for a less complex system.

Further, energy storage typically requires a DC link. Accordingly, another benefit of a DC coupled topology is the ease of storage integration on the same dc-link in order to store any uncaptured power from the PV and to stabilize power output of the system in case of clouds or any other emergency events by discharging the previously stored energy.

However, existing DC coupled hybrid systems must be designed to fit custom specifications with defined and limited input voltage ranges and load current ranges. Attempting to work outside those ranges can affect the stability of the voltage conversion and it may affect the integrity of the converter itself. Accordingly, any change in either the DC source, such as a change from a PV source to a generator or battery, may destabilize the system, and any change in the output current can do the same.

There is a need for a DC coupled hybrid system that can automatically and reliably adapt to changing power sources and changing loads. There is a further need for such a system that can reliably function without any adjustment or need to change components across a wide range of input voltages and load currents.

SUMMARY

A multi-purpose DC to DC converter system is provided to work as a connection block between different sources in a DC coupled hybrid system. Also provided is a controller for controlling the DC-DC converter. The DC to DC converter typically has a non-isolated Buck-Boost convertor topology and keeps the output voltage constant and ripple free regardless of changes in load current or the input voltage of the power source. The controller stabilizes the output voltage while the DC-DC converter's passive components remain unchanged. Accordingly, the converter may be inserted into systems with different operating conditions, and may transition between power sources in hybrid energy source systems.

Further, the use of a DC-DC converter allows for the easy use of the same converter with only minor adjustments on the control side to work as MPPT if connected to a PV power source or to act as a charger if connected to a battery bank.

Accordingly, in some embodiments, a method is provided for setting an operating parameter for a DC to DC voltage converter. The DC to DC voltage converter may be a buck boost converter. The method comprises first operating a load, using a controller, with the operating parameter at a first value, then providing, at the controller, a measurement of an actual inductor current at an inductor of the DC to DC voltage converter and providing, at the controller, a measurement of an actual load current drawn by a DC load at an output of the DC to DC voltage converter.

The method then determines, at the controller, a reference value for the inductor current, based on the actual load current combined with an inductor current adjustment value, wherein the inductor current adjustment value is based on a desired output voltage at the DC load.

The reference value for the inductor current is then compared to the actual inductor current, and the operating parameter is maintained at the first value if the reference value is greater than the actual inductor current. The operating parameter is changed to a second value if the reference value is less than the actual inductor current. The controller may be a sliding surface mode controller, and the operating parameter may be the output of the controller.

In some embodiments, this method repeats continuously, such that after the operating parameter is either maintained at the first value or changed to the second value, an updated measurement of the actual inductor current and an updated measurement of the actual load current are provided to the controller. The controller then determines an updated reference value for the inductor current based on the updated load current and again sets or maintains the operating parameter at the first value if the updated reference vale us greater than the actual inductor current and sets or maintains the operating parameter at the second value if the updated reference value is less than the actual inductor current.

In such embodiments, the actual inductor current and actual load current are continuously updated and the parameter is continuously set or maintained.

In some embodiments, where multiple DC sources are provided, the DC to DC voltage converter receives input voltages selectively from the multiple sources, and the inductor current adjustment value may be based, in part, on a measurement of the input voltage from a selected DC source. In some such embodiments, the method may further comprise switching the DC to DC voltage converter from a first of the multiple sources to a second of the multiple sources while operating the method and determining an updated inductor current adjustment based partially on a measurement of the input voltage from a newly selected Dc source.

In some embodiments, the controller is provided with a measurement of an actual voltage across the DC load. The actual voltage may then be compared to a desired output voltage, and an error adjustment may be generated based on the difference between the actual voltage and the desired output voltage. In such an embodiment, the reference value for the inductor current may further incorporate the error adjustment.

In some such embodiments, the error adjustment may comprise a combined output of a plurality of PID controllers with different penetration gain, wherein the penetration gain of each of the plurality of PID controllers varies with time elapsed since an initialization of the system or a change in a reference voltage. For example, a first of the PID controllers may be less aggressive than a second of the PID controllers. The penetration gain of the first, less aggressive PID controller may then be reduced with the passage of time and the penetration gain of the second, more aggressive PID controller may then be increased with the passage of time.

In such an embodiment incorporating a plurality of PID controllers, the inductor current reference value may take the form:

$$i_{ref} = -\left(1 + \frac{v_{ref}}{E}\right)\left(\frac{-v_{ref}}{R}\right) + i_{load} + \left[K_{p1}\Delta V(t) + K_{i1}\int_0^t \Delta V(\tau)d\tau + K_{d1}\frac{d\Delta V}{dt}\right] * \alpha^n + \left[K_{p2}\Delta V(t) + K_{i2}\int_0^t \Delta V(\tau)d\tau + K_{d2}\frac{d\Delta V}{dt}\right] * (1 - \alpha^n)$$

In the expression provided, $v_{ref}$ is the desired output voltage at the DC load, E is a measurement of an input voltage from a DC source, R is a resistance of a resistor in the DC to DC voltage converter, $i_{load}$ is the actual load current, Kp1, Ki1, Kd1, Kp2, Ki2, and Kd2 are tuning constants, $\Delta V(t)$ is a difference between a measurement of an output voltage and $v_{ref}$, $\alpha$ is a value between 0 and 1, and n is an integer that increases with every step in time.

In some embodiments, a hybrid power system is provided, the system comprising a plurality of DC sources, a DC load, a DC to DC voltage converter, and a controller for setting an operating parameter for the DC to DC voltage converter. The DC to DC voltage converter may be a buck boost converter, and the controller may be a sliding surface mode controller.

The controller receives measures of an actual inductor current in the DC to DC voltage converter and an actual load current at the DC load, and the controller determines a reference value for the inductor current based on the actual load current combined with an inductor current adjustment value, where the inductor current adjustment value is based on a desired output voltage at the DC load. The controller provides a first value for the operating parameter when the reference value is greater than the actual inductor current and a second value for the operating parameter when the reference value is less than the actual inductor current.

In some embodiments, the inductor current adjustment value is based in part on an input voltage at the DC to DC voltage converter from at least one of the DC sources. The system may selectively receive an input voltage from one of the DC sources. When the system switches to a different DC source, the inductor current adjustment value is then modified based in part on an input voltage at the DC to DC voltage convertor from a different one of the DC sources.

In some embodiments, at least one of the DC sources may be an AC to DC power converter.

In some embodiments, the controller receives a measurement of an actual voltage across the DC load, compares the actual voltage to the desired output voltage, and generates an error adjustment based on a difference between the actual voltage and the desired output voltage, where the reference value for the inductor current further incorporates the error adjustment.

Such an error adjustment may comprise the combined output of a plurality of PID controllers with different penetration gain.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
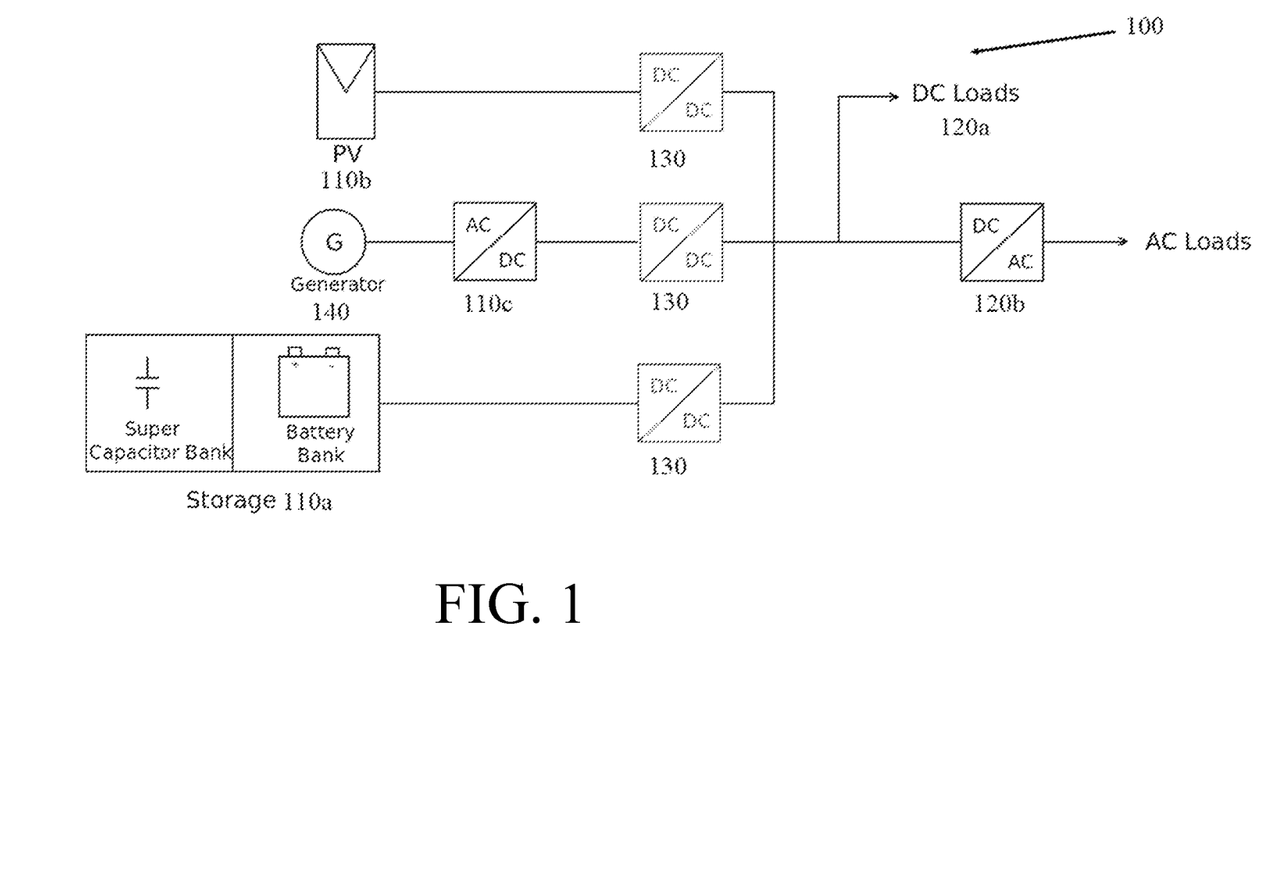
FIG. 1 is a schematic diagram of a DC-Coupled hybrid energy system in accordance with the present disclosure.

FIG. 1 is a schematic diagram of a DC-Coupled hybrid energy system 100 in accordance with the present disclosure. As shown, the system has a plurality of DC sources 110a, b, c, and at least one DC load 120a, b. The system then provides one or more DC to DC voltage converter 130. As such, a single DC to DC voltage converter may be used for the system as a whole, or such a voltage converter may be paired with each power source.

The DC sources may include a power storage 110a, such as a battery bank or a super capacitor bank, a photovoltaic panel or array 110b, and an AC to DC voltage converter 110c, which allows AC sources, such as a generator 140, to be used in the hybrid power system 100.

Similarly, the DC load 120a may be anything that a user wishes to power using the system and may be an actual DC device or it may be a DC to AC voltage converter 120b which may allow AC devices to be powered by the system.

While the power storage 110a is shown as a DC source, such a power storage device may be connected as both a DC source and a DC load, such that when excess power is generated it may be fed to the power storage. In such an embodiment, an additional control method may be used to determine an appropriate command voltage for such an energy management system.

Figure 2:
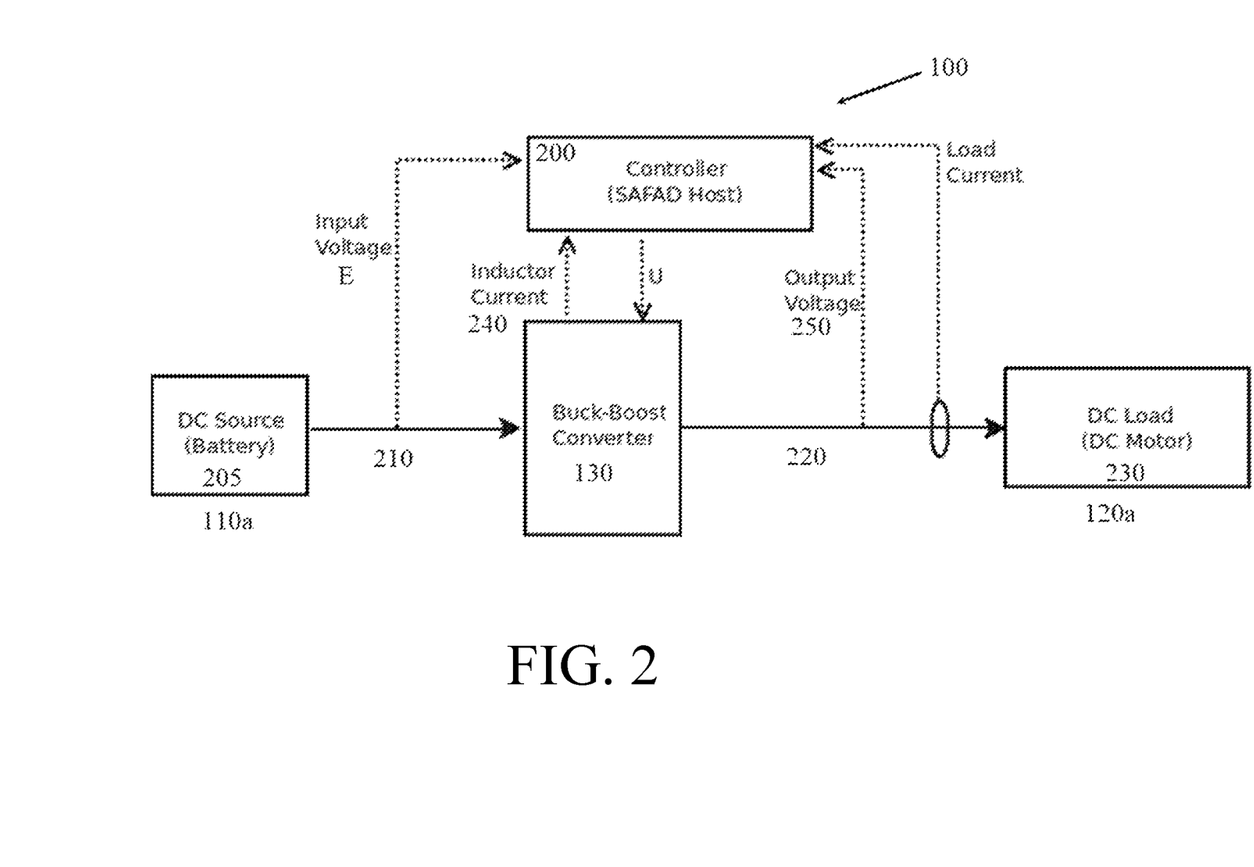
FIG. 2 is a schematic diagram showing the operation of a controller for the DC-Coupled hybrid system shown in FIG. 1.

FIG. 2 is a schematic diagram showing the operation of a controller 200 for the DC-Coupled hybrid system 100 shown in FIG. 1. As shown, the controller 200 is connected to the DC to DC voltage converter 130 and sets an operating parameter U which is then provided to the DC to DC voltage converter 130. As shown, the voltage converter is typically a buck-boost converter 130.

In the operation example shown, a battery 205 is provided as a DC source 110a which provides an input voltage 210 to the buck-boost converter 130. The buck-boost converter 130 then provides an output voltage 220 to a DC motor 230, provided as a load 120a.

As shown, the controller 200 receives a measure of an actual inductor current $i_{measured}$ 240 from the buck-boost converter 130 and an actual load current $i_{load}$ measured between the converter and the DC motor 230. As discussed in more detail below, the controller is also provided with a measure of the input voltage E 210 and an actual measure of an output voltage $v_{measured}$ 250 provided from the buck-boost converter 130 to the DC motor 230.

Figure 3:
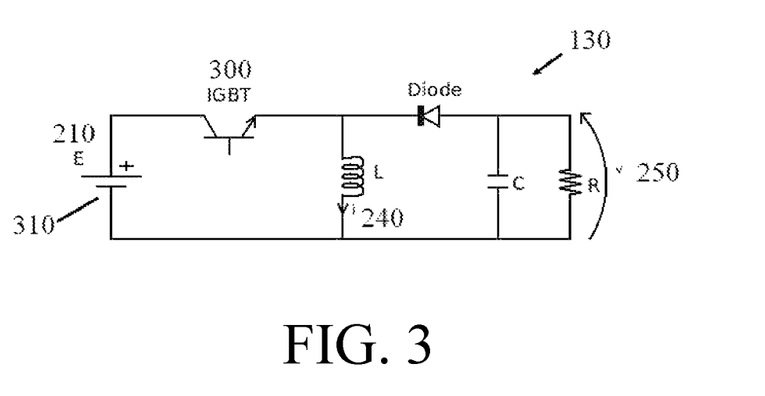
FIG. 3 is a circuit diagram showing an exemplary topography for a buck-boost converter as used in the DC-Coupled hybrid energy system.

FIG. 3 is a circuit diagram showing an exemplary topography for a buck-boost converter 130 as used in the DC-Coupled hybrid energy system 100. As shown, the converter has an insulated gate bipolar transistor (IGBT) 300 which functions as a switch responsive to the control signal U provided from the controller 200. The converter 130 is provided with an input voltage E 210 at a voltage source 310, and the inductor current $i_{measured}$ 240 provided to the controller is measured at the inductor with an inductance value L. The converter 130 further has a capacitor with a capacitance value C, a resistor with a resistance value R, and a diode, as shown. The output voltage $v_{measured}$ 250 of the converter 130 provided to the DC motor 230 is the voltage across the resistor R.

The buck-boost converter 130 shown in FIG. 3 and incorporated into the schematic diagram of FIG. 2 can therefore be modeled during use as follows:

Because voltage across the inductor is given by $$v = L\frac{di}{dt},$$

The derivative of the current across the inductor L can be shown as:

$$\frac{di}{dt} = (1-u)\frac{v}{L} + u\frac{E}{L} \qquad (1.1)$$

Similarly, because current passing through the capacitor is given by $$i = c\frac{dv}{dt},$$

the derivative of the voltage across the resistor R can be shown as:

$$\frac{dv}{dt} = -(1-u)\frac{i}{c} - \frac{v}{RC} \qquad (1.2)$$

In both eq. 1.1 and 1.2, U is the control signal applied at IGBT 300, v is the voltage across the resistor R, i is the current at the inductor L, and R, C, and L are the resistor, current, and inductor values respectively.

The formulas can be normalized as:

$$\frac{dx_1}{dt} = (1-u_{av})x_2 + u_{av} \qquad (2.1)$$

and:

$$\frac{dx_2}{dt} = -(1-u_{av})x_1 - \frac{x_2}{Q} \qquad (2.2)$$

where:

$$x_1 = i\frac{1}{E}\sqrt{\frac{L}{C}} \qquad (2.3)$$

$$x_2 = v\frac{1}{E} \qquad (2.4)$$

$$Q = R\sqrt{\frac{C}{L}} \qquad (2.5)$$

$$\tau = t\frac{1}{\sqrt{LC}} \qquad (2.6)$$

This model of the buck-boost converter 130 allows for the application of a sliding surface mode controller implemented by the controller 200. The controller 200 then calculates, using a processor, a value for U by way of a sliding surface mode controller.

A sliding surface mode controller is a nonlinear control method that controls the output of a nonlinear system, in this case the buck-boost converter 130, by application of a discontinuous control signal U. In the embodiment shown, the control signal U is binary, with an output of 0 or 1. The control signal U forces the converter 130 to "slide" along a cross-section of the converter's overall behavior. Because the control signal U is discontinuous, the feedback causes the system to switch between continuous control structures designed such that the trajectories of the system in each control structure trend towards the other structure and the system as a whole is maintained along a surface S.

Referring to equations (2.1) and (2.2) above, x' can be provided taking the form:

x=f(x)+g(x)u, which provides that:

$$f(x) = \begin{bmatrix} x_2 \\ -x_1 - \frac{1}{Q}x_2 \end{bmatrix}$$

and $$g(x) = \begin{bmatrix} 1 - x_2 \\ x_1 \end{bmatrix}$$

A sliding surface S can then be found which satisfies the equation:

$$S = \{x \in R^n \sqrt{/h(x)} = 0\}$$

In such an equation, a control action u(x) exists which converges the h(x) to 0 by the x(t). The trajectory of x(t) on the sliding surface S then produces the desired behavior.

h(x) is a scalar function, $L_f h(x)$ is the directional derivative of h(x) in the direction of f(x), and $L_g h(x)$ is the directional derivative of h(x) in the direction of g(x). Accordingly, $L_f h(x)$ and $L_g h(x)$ can be expressed as follows:

$$L_f h(x) = \frac{\partial h}{\partial x^T} f(x)$$

$$L_g h(x) = \frac{\partial h}{\partial x^T} g(x)$$

The function h(x) satisfies the following invariance condition:

$$\dot{h}(x) = \frac{\partial h}{\partial x}(f(x) + g(x)u_{eq}(x)) = 0 \quad (3.1)$$

This is the invariance condition that h(x) should follow. $u_{eq}(x)$ is the smooth feedback control law, which maintains the state trajectory on the surface S. After applying the directional derivative of h(x) once in the f(x) direction and once in the g(x) direction, this invariance condition can be expressed as:

$$L_f h(x) + [L_g h(x)] u_{eq}(x) = 0 \quad (3.2)$$

The equivalent control law can be expressed as follows:

$$u_{eq}(x) = \frac{-L_f h(x)}{L_g h(x)} \quad (3.3)$$

The controlled vector field and the evolution over the smooth manifold S of the state trajectories can be expressed as follows:

$$\dot{x} = f(x) - g(x)\frac{L_f h(x)}{L_g h(x)} \quad (3.4)$$

For the buck boost converter, choosing the indirect control on the inductor current, the control problem is defined with a goal of converging h(x) to zero. Accordingly, the actual current $i_{measured}$ across the inductor 240, multiplied by a constant and represented in the formulas as $x_1$, is then converged with a reference current $i_{ref}$ corresponding with a desired current passing through the inductor, multiplied by the same constant as the actual current across the inductor 240, and represented in the formulas as $\bar{x}_1$. The control problem then becomes converging the following to 0:

$$h(x) = x_1 - \bar{x}_1 \quad (3.5)$$

The control signal is then selected using the following relation:

$$u = \begin{Bmatrix} 1 \, if \, (x_1 - \bar{x}_1) < 0 \\ 0 \, if \, (x_1 - \bar{x}_1) > 0 \end{Bmatrix} \quad (3.6)$$

Finding $L_f h(x)$ and $L_g h(x)$ for h(x) provides:

$L_f h(x) = x_2$, and $L_g h(x) = 1 - x_2$

Substituting these values into eqn. (3.4) and equating to 0 at equilibrium point we can find:

$$\bar{x}_1 = \frac{-\bar{x}_2}{Q}(1 - \bar{x}_2) \quad (3.7)$$

where $\bar{x}_1$, $\bar{x}_2$ are the reference values for the states. Replacing $\bar{x}_1$ with $i_{ref}$ and $-\bar{x}_2$ with $v_{ref}$ results in:

$$i_{ref-base} = -\left(1 + \frac{v_{ref}}{E}\right)\left(\frac{-v_{ref}}{R}\right) \quad (3.8)$$

$i_{ref-base}$ is the base part to calculate the inductor current reference value $i_{ref}$ to control the inductor current, and thereby control the output voltage for the buck-boost converter 130. Accordingly, $i_{ref-base}$ is based on the value of the resistor R of the buck-boost converter 130, the actual input voltage E 210, of the converter, and a desired output voltage for the converter, shown as $v_{ref}$.

These values may then be used in a method for selecting an operating parameter U for the DC to DC voltage converter 130. Such a method is shown in a flowchart in FIG. 4. As shown, the method comprises operating a load, using the controller 130, with the operating parameter U set to a first value (at 400). The controller is provided (at 410) with a measurement of the actual inductor current 240 at the inductor L of the DC to DC voltage converter 130, in this case a buck-boost converter. The controller is further provided (at 420) with a measurement of an actual load current $i_{load}$ drawn by a DC load 230 at an output of the buck-boost converter 130.

Figure 4:
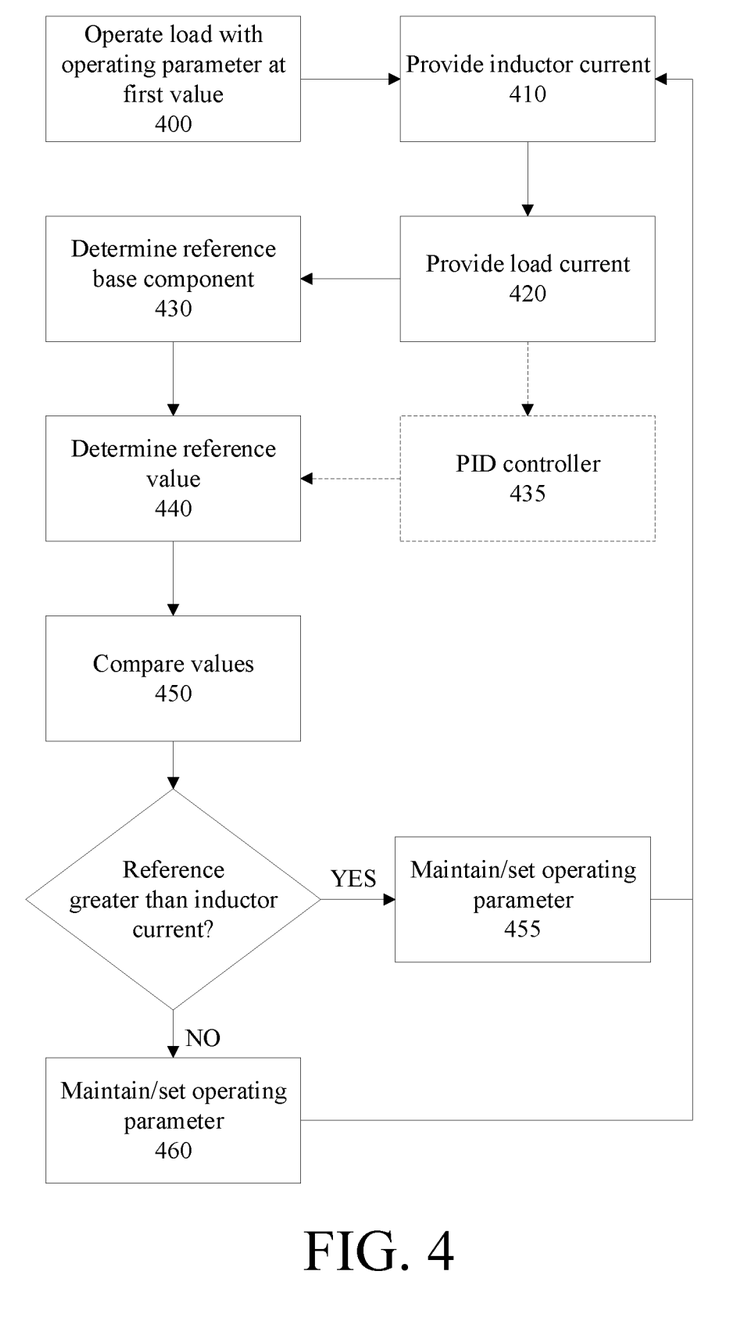
FIG. 4 is a flowchart illustrating a method of setting an operating parameter for a DC to DC voltage converter.

The controller then determines (at 430), a reference base component for the inductor current, $i_{ref-base}$, and then uses that value to determine (at 440) a reference value for the inductor current $i_{ref}$. This reference value for the inductor current is a desired value for the inductor current 240, and it is based on the base component, $i_{ref-base}$, and the actual load current $i_{load}$ 230. In some embodiments, additional factors may be incorporated into the reference value (at 440). As discussed in more detail below, additional controllers, such as PID controllers, may be incorporated for error compensation.

As discussed above, $i_{ref-base}$ can be provided (at 430) as:

$$i_{ref-base} = -\left(1 + \frac{v_{ref}}{E}\right)\left(\frac{-v_{ref}}{R}\right)$$

As provided by eq. (3.8), the reference value for the inductor current 240 can then be found (at 440) as:

$$i_{ref} = i_{ref-base} + i_{load} \quad (3.9)$$

by adding the reference base component to the actual current 230 flowing through the load. As shown, the reference base component $i_{ref-base}$ is based the value of the resistor R in the buck-boost converter 130 and the input voltage E of the system 210. As discussed above, $v_{ref}$ is the desired output voltage for the converter 130, and may be specified by a user or by the DC load 230 itself.

Once the reference value for the inductor current is found (at 440), the reference value for the inductor current $i_{ref}$ is compared to the actual inductor current $i_{measured}$ 240 (at 450). If the reference value is greater than the actual inductor current 240, then the operating parameter U is maintained at the first value (At 455), and if the reference value is less than the actual inductor current, the operating parameter is changed to a second value (at 460).

In some embodiments, the method is applied continuously. Accordingly, regardless of whether the operating parameter has been changed (at 455 or 460), the method will then return to step 410 and continue to provide the controller 130 with updated measurements of the actual inductor current 240 (at 410) and updated measurements of the actual load current 230 (at 420). The controller will then determine an updated reference base value (at 430) and use it to generate an updated reference value for the inductor current (at 440) based on the updated load current 230.

It is noted that $i_{ref-base}$ will only change if either the desired voltage, $v_{ref}$, changes, due to a change in DC load 230, or if the input voltage E 210 changes due to a change in DC source 205, which may be due to actually switching sources or, in the case of certain power supplies, such as PV systems, a reduction in output. This may occur when, for example, the sun is occluded by a cloud, thereby reducing the output of a PV system. However, if there is no change in the DC source 205 or the DC load 230, then the reference base value, determined at 430, will remain constant and the only change would be based on the updated load current 230, acquired at 420.

Accordingly, in each cycle through the method described, the reference value for the inductor current $i_{ref}$ is compared to the actual inductor current $i_{measured}$ 240 (at 450). If the reference value is greater than the actual inductor current 240, then the operating parameter is set to or maintained at the first value (at 455), and if the reference value is less than the actual inductor current, the operating parameter is set to or maintained at the second value (at 460).

In embodiments with multiple DC sources 110a, b, c, such as in that shown in FIG. 1, the DC to DC voltage converter 130 receives input voltage 210 selectively from the plurality of DC sources. The inductor current reference adjustment value, determined at 430, is based in part on the measurement of the input voltage 210 from a selected DC source 110a, b, c. It will be understood that although the method and system are discussed in terms of receiving an input voltage 210 from a DC source, the input voltage may be received from multiple DC sources. Accordingly, while the system in FIG. 1 provides a battery bank 110a, a PV array 110b, and a generator 110c, these sources may be combined to meet a voltage demand. For example, during daylight hours, the PV array 110b may provide the bulk of the input voltage 210. However, if the sun is occluded and the output of the PV array is reduced below a required level, voltage may be drawn from the battery bank 110a to supplement the PV array. Similarly, if the battery bank is depleted, or the PV array is not providing any voltage, such as at night, the generator 110c may supplement the input voltage 210 for the converter 130.

Accordingly, the input voltage E 210 represents the sum of all voltage from the DC sources. It is further noted that while all sources are discussed as DC sources, an AC source, such as generator 110C may be used by way of an AC to DC converter.

When multiple DC sources 110a, b, c are provided, the system may shift from one source, such as photovoltaic system 110b, to a second source, such as the battery bank 110a. In that case, the input voltage 210 will change, thereby changing E in eq. (3.8) resulting in an updated inductor current adjustment value based on a measurement of the input voltage 210 from the newly selected source. As noted above, this may be a newly selected combination of sources. Accordingly, the operation of the controller 200 is DC source agnostic, as any change in the source voltage will be automatically accounted for in the method.

Similarly, if the load is changed, the desired voltage $v_{ref}$ may be updated, thereby resulting in an updated inductor current adjustment value $i_{ref-base}$. Further, if the load changes but the desired voltage is the same, then the load current $i_{load}$ across the load 230 will change and such a change will again be automatically accounted for in the reference value for the inductor current.

Figure 5:
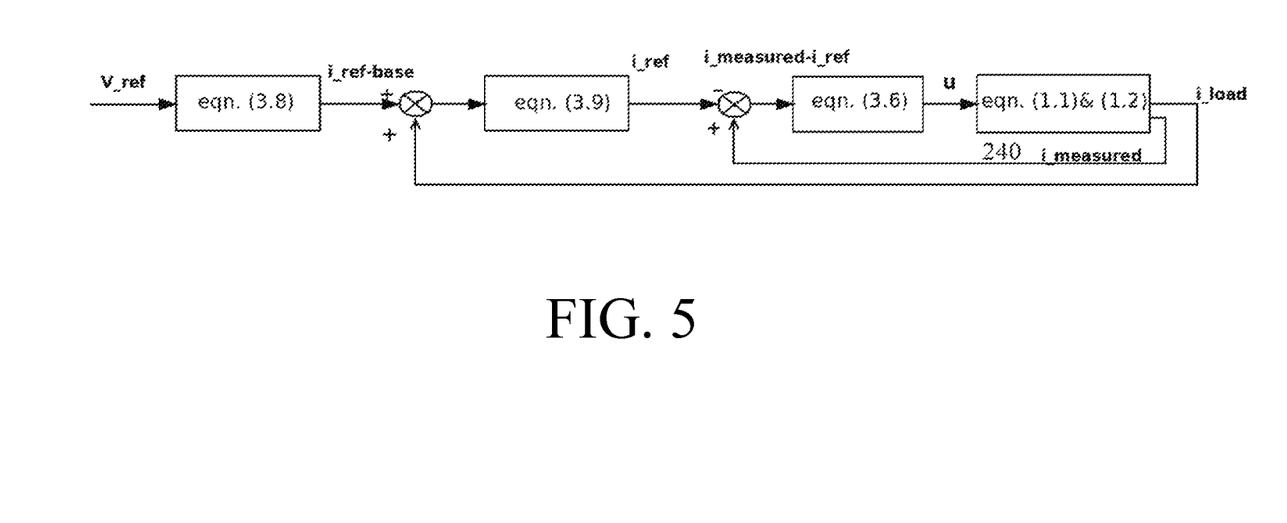
FIG. 5 shows the evaluation of an operating parameter for the DC-Coupled hybrid system of FIG. 1.

FIG. 5 shows the setting of an operating parameter U for the DC-Coupled hybrid system of FIG. 1. As shown, the reference voltage $v_{ref}$, typically selected by a user, is incorporated into eq. (3.8) above and outputs $i_{ref-base}$. $i_{ref-base}$ is then added to $i_{load}$ in eq. (3.9) and is compared to the actual inductor current $i_{measured}$ 240 measured by the system.

Each of $i_{measured}$, the inductor current 240, and $i_{ref}$ can be multiplied by a constant $$\frac{1}{E} * \sqrt{\frac{L}{C}}$$

in order to transform them into $x_1$ and $\bar{x}_1$ respectively. Accordingly, since U is determined based on which of the inductor current 240 and the reference current is greater, the comparison is identical to the setting of the operating parameter U as shown in eq. (3.6).

The operating parameter U is then applied to the buck-boost converter 130 at the IGBT, and results in the behavior defined by eqs. (1.1) and (1.2).

Figure 6:
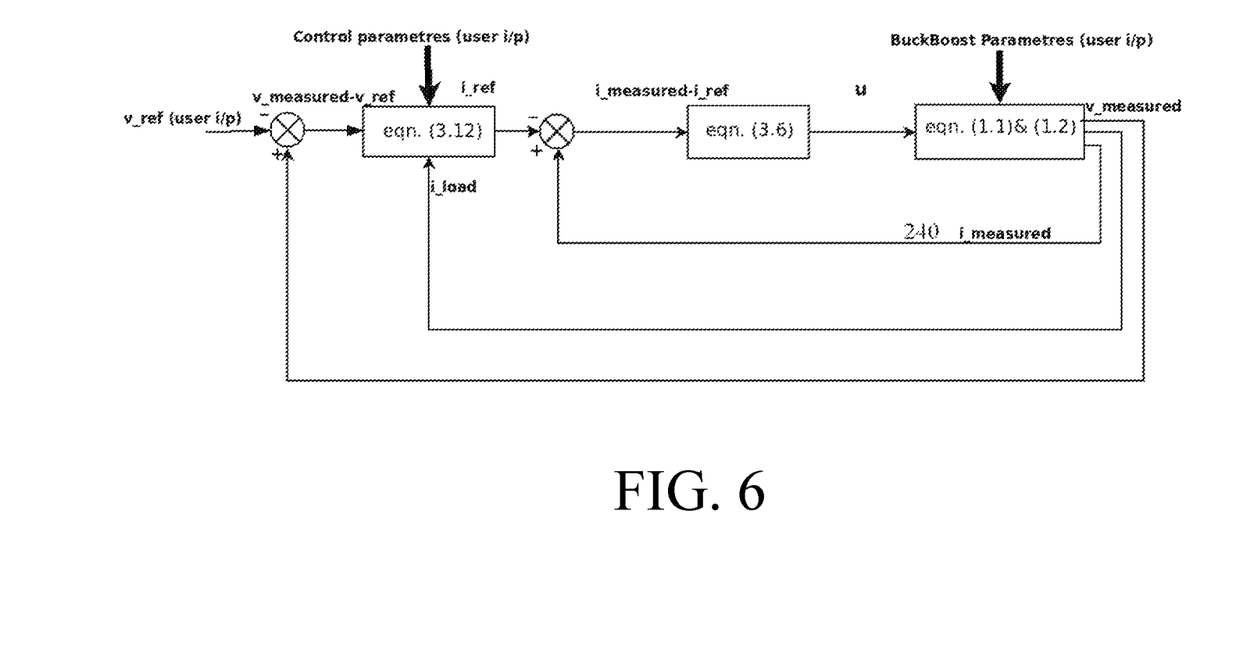
FIG. 6 shows a modification of a reference current for use in evaluating an operating parameter for the DC-Coupled hybrid system of FIG. 1.

In some embodiments, the method discussed above with respect to FIGS. 4 and 5 may be modified by using an error compensation controller. FIG. 6 shows a modification of a reference current for use in evaluating an operating parameter for the DC-Coupled hybrid system of FIG. 1. The embodiment shown provides an additional feedback loop implementing a proportional-integral-derivative (PID) controller for error compensation.

A PID controller is a control loop using feedback to continuously modulate the sliding surface mode controller for selecting the operating parameter U. The PID controller continuously calculates an error value, in this case $\Delta V$, corresponding to the difference between the actual output voltage and the desired output voltage $v_{ref}$. The controller typically takes the form:

$$PID = \left[ K_p \Delta V(t) + K_i \int_0^t \Delta V(\tau) d\tau + K_d \frac{d\Delta V}{dt} \right]$$

$\Delta V$ is the error being evaluated, $K_p$, $K_i$, and $K_d$ are coefficients for the proportional, integral, and derivative terms, respectively. A PID controller can be described by its aggressiveness. The more aggressive a PID controller is, the faster it will reach its setpoint, but the more likely it is to suffer from oscillations once it arrives at the setpoint. A less aggressive PID controller would, on the other hand, take longer to reach the setpoint.

In the system and method discussed above, when the system is proceeding normally, only small errors would be expected, and therefore a less aggressive PID controller. However, when a change is incorporated into the system, such as a sudden change in the input voltage 210 due to a change in the DC source 110a, b, c, or a sudden change in the DC load, a more aggressive PID controller is appropriate.

Accordingly, in some embodiments, two distinct PID controllers are provided. These are then applied to the same error signal $\Delta V$, and each controller is multiplied by a penetration gain, which changes with time. The sum of both gains is equal to 1, and no gain will exceed 1. In this way, at an initial time, a less aggressive PID controller, $PID_{add1}$ governs the behavior of the error response control loop. Over time, the influence of the less aggressive PID controller $PID_{add1}$ decreases, and the influence of a second more aggressive PID controller, $PID_{add2}$, increases. This can be seen in the following:

$$PID_{add1} = \left[ K_{p1} \Delta V(t) + K_{i1} \int_0^t \Delta V(\tau) d\tau + K_{d1} \frac{d\Delta V}{dt} \right] * \alpha^n \quad (3.10)$$

$$PID_{add2} = \left[ K_{p2} \Delta V(t) + K_{i2} \int_0^t \Delta V(\tau) d\tau + K_{d2} \frac{d\Delta V}{dt} \right] * (1 - \alpha^n) \quad (3.11)$$

In the formula shown, $K_{p1}$, $K_{i1}$, $K_{d1}$, $K_{p2}$, $K_{i2}$, and $K_{d2}$ are tuning constants, $\Delta V(t)$ is a difference between a measurement of an output voltage, $v_{measured}$ and $v_{ref}$. $\alpha$ is a value between 0 and 1, and n is an integer that increases with every step in time.

$\alpha$ then controls the penetration gain, such that with every step forward in time, the influence of $PID_{add1}$ decreases, and the influence of $PID_{add2}$ increases.

The time value that governs the value of n is generally the occurrence of an event that would be expected to change the behavior of the system. Accordingly, the time could be reset upon the initialization of the system or upon a switch between DC sources 110a, b, c.

By adding the PID controllers to reference value for the inductor current, $i_{ref}$, two additional terms are added to eq. (3.9), resulting in:

$$i_{ref} = i_{ref\text{-}base} + i_{load} + PID_{add1} + PID_{add2} \quad (3.12)$$

Expanding the terms in (3.12) results in:

$$i_{ref} =$$
$$-\left(1 + \frac{V_{ref}}{E}\right)\left(\frac{-V_{ref}}{R}\right) + i_{load} + \left[ K_{p1} \Delta V(t) + K_{i1} \int_0^t \Delta V(\tau) d\tau + K_{d1} \frac{d\Delta V}{dt} \right] *$$
$$\alpha^n + \left[ K_{p2} \Delta V(t) + K_{i2} \int_0^t \Delta V(\tau) d\tau + K_{d2} \frac{d\Delta V}{dt} \right] * (1 - \alpha^n)$$

which may then be used as the reference value for the inductor current to be compared to the actual inductor current 240. The various tuning constants are selected such that the first PID controller is more aggressive than the second PID controller.

As shown in FIG. 6, the implementation of the PID controllers results in an additional feedback loop. Accordingly, the controller is provided with a measure of actual voltage across the DC load 250. This may be performed in the method discussed above when the actual load current across the DC load 230 is provided, at step 420. The system can then determine an actual error in the voltage value, and calculate value for both PID controllers, which may be performed during the method discussed above at (435).

Accordingly, eq. (3.12) combines the terms of $i_{ref}$, including $i_{load}$, to provide a complete reference value for the inductor current, another feedback loop then provides the actual inductor current 240 for comparison. As shown and discussed above with respect to FIG. 5, eq. (3.6) is then used to set the operating parameter U.

The operating parameter U is then applied to the buck-boost converter 130 at the IGBT, and results in the behavior defined by eqs. (1.1) and (1.2).

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the invention disclosed herein may comprise a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memristors, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for setting an operating parameter for a DC to DC voltage converter, the method comprising:
   operating a load, using a controller, with the operating parameter at a first value;
   providing, at the controller, a measurement of an actual inductor current at an inductor of the DC to DC voltage converter;
   providing, at the controller, a measurement of an actual load current drawn by a DC load at an output of the DC to DC voltage converter;
   determining, at the controller, a reference value for the inductor current, based on the actual load current combined with an inductor current adjustment value, wherein the inductor current adjustment value is based on a desired output voltage at the DC load,
   comparing the reference value for the inductor current to the actual inductor current, and maintaining the operating parameter at the first value if the reference value is greater than the actual inductor current, and changing the operating parameter to a second value if the reference value is less than the actual inductor current.

2. The method of claim 1 further comprising:
   providing, at the controller, an updated measurement of the actual inductor current and an updated measurement of the actual load current,
   determining, at the controller, an updated reference value for the inductor current based on the updated load current,
   setting the operating parameter to the first value if the updated reference value is greater than the actual inductor current, and setting the operating parameter to the second value if the reference value is less than the actual inductor current, and
   continuously updating the actual inductor current and actual load current, determining the updated reference value, and setting the operating parameter.

3. The method of claim 2, wherein the DC to DC voltage converter receives an input voltage selectively from a plurality of DC sources, and wherein the inductor current adjustment value is based in part on a measurement of the input voltage from a selected DC source.

4. The method of claim 3, further comprising switching the DC to DC voltage converter from a first of the plurality of DC sources to a second of the plurality of DC sources while operating the method, and determining an updated inductor current adjustment value based partially on a measurement of the input voltage from a newly selected DC source.

5. The method of claim 1, further comprising:
   providing, at the controller, a measurement of an actual voltage across the DC load;
   comparing the actual voltage to the desired output voltage;
   generating an error adjustment based on a difference between the actual voltage and the desired output voltage;
   wherein the reference value for the inductor current further incorporates the error adjustment.

6. The method of claim 5, wherein the error adjustment comprises a combined output of a plurality of PID controllers with different penetration gain, wherein the penetration gain of each of the plurality of PID controllers varies with time elapsed since an initialization of the system, a change in an input voltage, or a change in a reference voltage.

7. The method of claim 6, wherein a first PID controller of the plurality of PID controllers is less aggressive than a second PID controller of the plurality of PID controllers, and wherein the penetration of the first PID controller reduces with the passage of time and the penetration of the second PID controller increases with the passage of time.

8. The method of claim 7, wherein the inductor current reference value is:

$$i_{ref} = -\left(1 + \frac{v_{ref}}{E}\right)\left(\frac{-v_{ref}}{R}\right) + i_{load} + \left[K_{p1}\Delta V(t) + K_{i1}\int_0^t \Delta V(\tau)d\tau + K_{d1}\frac{d\Delta V}{dt}\right] * \alpha^n + \left[K_{p2}\Delta V(t) + K_{i2}\int_0^t \Delta V(\tau)d\tau + K_{d2}\frac{d\Delta V}{dt}\right] * (1 - \alpha^n)$$

wherein:
$v_{ref}$ is the desired output voltage at the DC load,
E is a measurement of an input voltage from a DC source,
R is a resistance of a resistor in the DC to DC voltage converter,
$i_{load}$ is the actual load current,
Kp1, Ki1, Kd1, Kp2, Ki2, and Kd2 are tuning constants,
$\Delta V(t)$ is a difference between a measurement of an output voltage and $v_{ref}$,
$\alpha$ is a value between 0 and 1, and
n is an integer that increases with every step in time.

9. The method of claim 1, wherein the DC to DC voltage converter is a buck boost converter.

10. The method of claim 1, wherein the controller is a sliding surface mode controller.

11. A hybrid power system comprising:
a plurality of DC sources;
a DC load;
a DC to DC voltage converter; and
a controller for setting an operating parameter for the DC to DC voltage converter,
wherein the controller receives measures of an actual inductor current in the DC to DC voltage converter and an actual load current at the DC load, and wherein the controller determines a reference value for the inductor current based on the actual load current combined with an inductor current adjustment value, where the inductor current adjustment value is based on a desired output voltage at the DC load, and
wherein the controller provides a first value for the operating parameter when the reference value is greater than the actual inductor current and a second value for the operating parameter when the reference value is less than the actual inductor current.

12. The hybrid power system of claim 11, wherein the inductor current adjustment value is based in part on an input voltage at the DC to DC voltage converter from at least one of the plurality of DC sources.

13. The hybrid power system of claim 12, wherein the system selectively receives an input voltage from the at least one of the plurality of DC sources, and wherein when the system switches to a different at least one of the plurality of DC sources, the inductor current adjustment value is modified to be based in part on an input voltage at the DC to DC voltage converter from the different at least one of the plurality of DC sources.

14. The hybrid power system of claim 11, wherein the DC to DC voltage converter is a buck boost converter.

15. The hybrid power system of claim 11, wherein the controller receives a measurement of an actual voltage across the DC load, compares the actual voltage to the desired output voltage, and generates an error adjustment based on a difference between the actual voltage and the desired output voltage, where the reference value for the inductor current further incorporates the error adjustment.

16. The hybrid power system of claim 15, wherein the error adjustment comprises a combined output of a plurality of PID controllers with different penetration gain, wherein the penetration gain of each of the plurality of PID controllers varies with time elapsed since a change in an initialization of the system, a change in an input voltage, or a change in a reference voltage.

17. The hybrid power system of claim 16, wherein a first PID controller of the plurality of PID controllers is less aggressive than a second PID controller of the plurality of PID controllers, and wherein the penetration of the first PID controller reduces with the passage of time and the penetration of the second PID controller increases with the passage of time.

18. The hybrid power system of claim 17, wherein the inductor current reference value is:

$$i_{ref} = -\left(1 + \frac{v_{ref}}{E}\right)\left(\frac{-v_{ref}}{R}\right) + i_{load} + \left[K_{p1}\Delta V(t) + K_{i1}\int_0^t \Delta V(\tau)d\tau + K_{d1}\frac{d\Delta V}{dt}\right] * \alpha^n + \left[K_{p2}\Delta V(t) + K_{i2}\int_0^t \Delta V(\tau)d\tau + K_{d2}\frac{d\Delta V}{dt}\right] * (1 - \alpha^n)$$

wherein:
$v_{ref}$ is the desired output voltage at the DC load,
E is a measurement of an input voltage from a DC source,
R is a resistance of a resistor in the DC to DC voltage converter,
$i_{load}$ is the actual load current,
Kp1, Ki1, Kd1, Kp2, Ki2, and Kd2 are tuning constants,
$\Delta V(t)$ is a difference between a measurement of an output voltage and $v_{ref}$,
$\alpha$ is a value between 0 and 1, and
n is an integer that increases with every step in time.

19. The hybrid power system of claim 11, wherein at least one of the DC sources is an AC to DC power converter or the DC load is a DC to AC power converter.

20. The hybrid power system of claim 11, wherein the controller is a sliding surface mode controller.

* * * * *